US009212466B2

(12) United States Patent
Yokota et al.

(10) Patent No.: US 9,212,466 B2
(45) Date of Patent: Dec. 15, 2015

(54) CONSTRUCTION MACHINE

(71) Applicant: KOBELCO CONSTRUCTION MACHINERY CO., LTD., Hiroshima-shi (JP)

(72) Inventors: Jumpei Yokota, Hiroshima (JP); Masaaki Murakami, Hiroshima (JP); Tomotaka Kita, Hiroshima (JP); Yoshihiko Ueda, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/520,611

(22) Filed: Oct. 22, 2014

(65) Prior Publication Data

US 2015/0136502 A1 May 21, 2015

(30) Foreign Application Priority Data

Nov. 20, 2013 (JP) ................................ 2013-239422

(51) Int. Cl.
*B60K 13/04* (2006.01)
*E02F 9/08* (2006.01)
*F02M 35/04* (2006.01)

(52) U.S. Cl.
CPC ............. *E02F 9/0883* (2013.01); *E02F 9/0808* (2013.01); *E02F 9/0833* (2013.01); *E02F 9/0858* (2013.01); *F02M 35/048* (2013.01)

(58) Field of Classification Search
CPC ..... E02F 9/0833; E02F 9/0883; E02F 9/0808; F02M 35/048
See application file for complete search history.

(56) References Cited

U.S. PATENT DOCUMENTS

| | | | | |
|---|---|---|---|---|
| 4,133,547 | A * | 1/1979 | Fox | 180/68.3 |
| 6,223,845 | B1 | 5/2001 | Miyachi et al. | |
| 7,967,094 | B2 * | 6/2011 | Matsushita et al. | 180/69.2 |
| 8,006,991 | B2 * | 8/2011 | Taniuchi et al. | 280/164.1 |

(Continued)

FOREIGN PATENT DOCUMENTS

| | | |
|---|---|---|
| EP | 2 053 167 A1 | 4/2009 |
| EP | 2 479 393 A1 | 7/2012 |

(Continued)

OTHER PUBLICATIONS

Extended European Search Report issued Apr. 20, 2015 in Patent Application No. 14190608.1.

(Continued)

*Primary Examiner* — John Walters
*Assistant Examiner* — Brian Swenson
(74) *Attorney, Agent, or Firm* — Oblon, McClelland, Maier & Neustadt, L.L.P.

(57) ABSTRACT

Provided is a construction machine including: an upper slewing body including an upper frame; an engine room on the rear portion of the upper frame; a cabin on the front portion on the right or left side of the upper frame; a plurality of tanks including a fuel tank and a hydraulic tank installed on the upper frame; an air cleaner; a center foothold on the intermediate portion in the width direction of the upper frame and forward of the engine room; and a climbing step at the opposite side to the cabin. A first tank of the plurality of tanks is placed on a portion on the right or left side of the upper frame, and a second tank is arranged on a portion between the cabin and the engine room on the opposite side to the first tank. The air cleaner is superposed on the second tank.

7 Claims, 5 Drawing Sheets

(56) References Cited

U.S. PATENT DOCUMENTS

| | | | | |
|---|---|---|---|---|
| 8,454,043 | B2 * | 6/2013 | Uto et al. | 280/169 |
| 8,505,661 | B2 * | 8/2013 | Tsuji et al. | 180/68.4 |
| 8,661,793 | B2 * | 3/2014 | Yamashita et al. | 60/295 |
| 8,985,262 | B2 * | 3/2015 | Sekiya et al. | 180/309 |
| 2010/0025136 | A1 * | 2/2010 | Matsushita et al. | 180/68.3 |
| 2012/0067660 | A1 * | 3/2012 | Kashu et al. | 180/296 |
| 2013/0037551 | A1 | 2/2013 | Nishiyama et al. | |
| 2013/0108404 | A1 * | 5/2013 | Okumura et al. | 414/687 |
| 2014/0000975 | A1 * | 1/2014 | Ueda | 180/291 |

FOREIGN PATENT DOCUMENTS

| | | |
|---|---|---|
| JP | 63-48965 U | 4/1988 |
| JP | 2-33461 | 2/1990 |
| JP | 8-302734 | 11/1996 |
| JP | 11-46514 | 2/1999 |
| JP | 2000-104280 | 4/2000 |
| JP | 2000-144811 | 5/2000 |
| JP | 2002-89380 | 3/2002 |
| JP | 2002-105982 | 4/2002 |
| JP | 2010-150835 | 7/2010 |
| JP | 2011-064132 | 3/2011 |
| JP | 5106711 | 12/2012 |
| JP | 2013-177748 | 9/2013 |
| JP | 2013-189785 | 9/2013 |

OTHER PUBLICATIONS

Office Action issued Sep. 15, 2015 in Japanese Patent Application No. 2013-239422.

* cited by examiner

CONSTRUCTION MACHINE

TECHNICAL FIELD

The present invention relates to a construction machine including an upper slewing body, such as an excavator.

BACKGROUND ART

There is conventionally known a construction machine including a lower travelling body and an upper slewing body mounted on the upper body so as to be slewable. The upper slewing body includes an upper frame, on which variable devices are installed.

For example, Japanese Patent Application Laid-open No. 2010-150835 discloses an excavator including a hydraulic tank and a fuel tank which are arranged in the front and rear direction, in a front portion at the right side of the upper frame. Japanese Patent No. 5106711 discloses an excavator including a hydraulic tank and a fuel tank which are arranged in the right and left direction. Japanese Patent Application Laid-open No. H08-302734 discloses an excavator including a fuel tank disposed at the rear of a cabin, that is, between the cabin and an engine room.

Each of the construction machines disclosed in Japanese Patent Application Laid-open No. 2010-150835 and Japanese Patent No. 5106711 further includes a center foothold and a climbing step continuous to the center foothold. Japanese Utility Model Application Laid-open No. S63-48965 discloses an air cleaner which is disposed at the rear of a cabin.

Furthermore, Japanese Patent Application Laid-open No. 2000-104280 discloses a construction machine including a hydraulic tank and a fuel tank, one of which is a specific tank placed rearward of a cabin, an air cleaner being provided at the right side of the specific tank and forward of an engine room.

For the above-described construction machines, it is important how install additional equipment, such as a liquid reducing-agent tank accumulating a reducing agent for reducing and purifying exhaust gas and a large battery involved by hybridization of machines, should be arranged within the limited space without troubles.

SUMMARY OF INVENTION

An object of the present invention is to provide a construction machine capable of accepting additional equipment, without troubles, by effective utilization of an existing space in an upper frame.

Provided by the present invention is a construction machine including: a lower travelling body; an upper slewing body slewably mounted on the lower travelling body and including an upper frame serving as a base; an engine room provided on a rear portion of the upper frame and accommodating an engine as a power source and related devices of the engine; a cabin provided on a front portion of one of right and left sides of the upper frame; a plurality of tanks placed on the upper frame and including a fuel tank which accumulates a fuel and a hydraulic tank which accumulates hydraulic fluid; an air cleaner which filters intake air of the engine; a center foothold for maintenance work provided in a portion of the upper frame forward of the engine room and on a widthwise intermediate portion of the upper frame; and a climbing step provided on a portion of the upper frame on an opposite side to the cabin and formed into a stair shape for guiding a maintenance person to the center foothold. The plurality of tanks includes a first tank which is disposed on a portion on one side of right and left sides in the upper frame and a second tank disposed on a portion on the other side of the right and left sides in the upper frame and between the cabin and the engine room, the air cleaner being superposed on the second tank.

DESCRIPTION OF EMBODIMENTS

Figure 7:
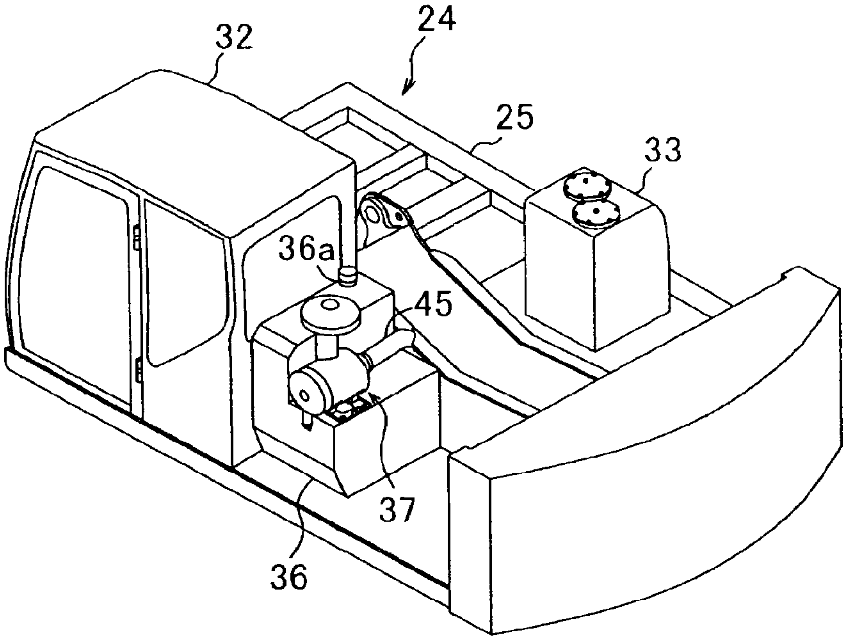
FIG. 7 is a perspective view of an upper slewing body of an excavator according to a second embodiment of the present invention.
Figure 8:
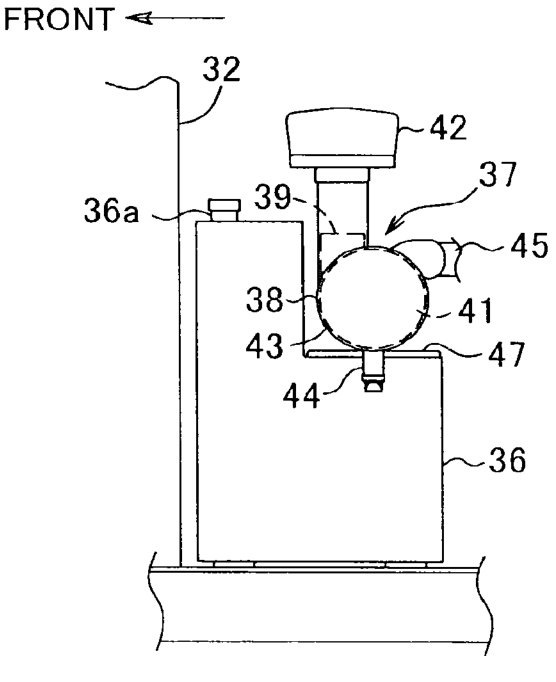
FIG. 8 is a side view of a portion where an air cleaner is placed in the excavator according to the second embodiment.
Figure 9:
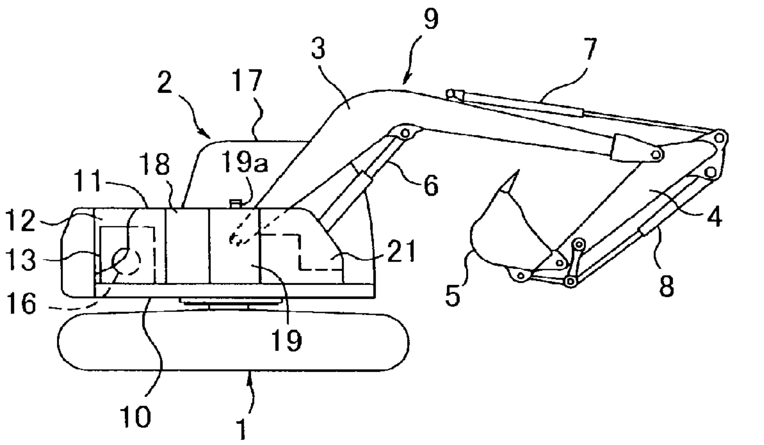
FIG. 9 is a side view of an excavator according to a comparison example for explaining the present invention.
Figure 10:
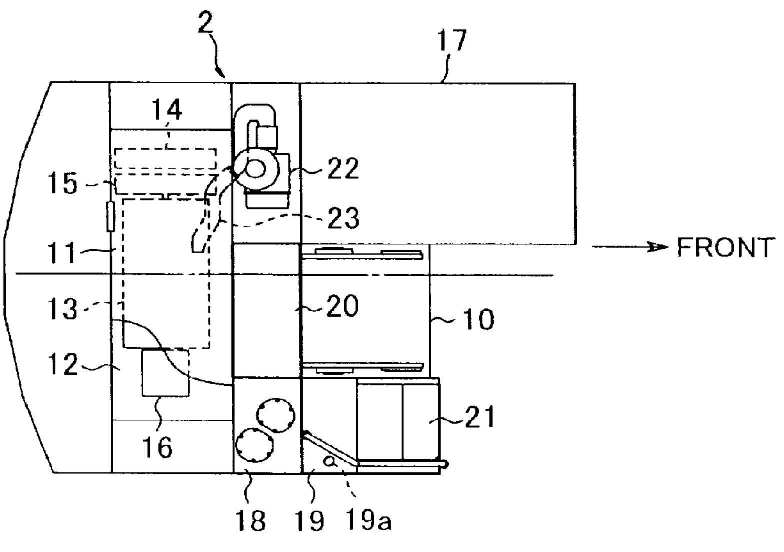
FIG. 10 is a plan view of the excavator shown in FIG. 9.

Embodiments of the present invention will be described. FIGS. 1 to 6 show a first embodiment of the present invention, and FIGS. 7 and 8 show a second embodiment of the present invention. FIGS. 9 and 10 show a comparison example imaged for explaining the embodiments.

Firstly described is an excavator according to the comparison example shown in FIGS. 9 and 10.

The excavator includes a crawler-type lower travelling body 1, an upper slewing body 2 mounted on the lower travelling body 1 slewably about an axis perpendicular to the ground, and a working attachment 9 loaded on a front portion of the upper slewing body 2. The attachment 9 has a boom 3, an arm 4, a bucket 5, and a plurality of cylinders, namely, a boom cylinder 6, an arm cylinder 7 and a bucket cylinder 8 which operate the boom 3, the arm 4 and the bucket 5, respectively.

The upper slewing body 2 has an upper frame 10 as a base, and various devices and equipment which are mounted on the upper frame 10. Specifically, mounted on the upper frame 10 are an engine room 12 and a cabin 17. The engine room 12 is provided on a rear portion of the upper frame 10, having a bonnet 11 adapted to open and close an opening which faces upward. In the engine room 12, there are installed an engine 13 as a power source, and related devices of the engine 13, namely, a radiator 14, a cooling fan 15, a hydraulic pump 16, etc. The cabin 17 is installed forward of the engine room 12, and at one of right and left sides (usually, at the left side; hereinafter, the description will be based on this assumption). In the present specification, "front and rear" and "right and left" are directions from the viewpoint of an operator who is seated in the cabin 17.

In the upper frame 10, there are further provided a hydraulic tank 18, a fuel tank 19, a center foothold 20, and a climbing step 21. The hydraulic tank 18 is placed on an opposite side to the cabin 17 with respect to the right and left direction (usually, at the right side) in the upper frame 10, and located forward of the engine room 12, and accumulates hydraulic fluid. The fuel tank 19 is arranged with the hydraulic tank 18 in the front and rear direction, and accumulates a fuel. The fuel tank 19 has an oil feeding portion 19*a*. The center foothold 20 is provided on a widthwise intermediate portion of the upper frame 10 immediately forward of the engine room 12, in order to allow maintenance of devices including the engine 13 in the engine room to be performed. The climbing step 21 is disposed forward of the fuel tank 19 and formed into a stair shape for guiding a maintenance person to the center foothold 20. Thus formed is a path for maintenance which reaches the center foothold 20 through the climbing step 21 and the upper surface of the fuel tank 19. FIG. 10 indicates a thick line surrounding the path and the center foothold 20 to distinguish them from other parts.

Over the upper frame 10, there are arranged an air cleaner 22 and an air intake piping 23. The air cleaner 22 is placed, for example, between the engine room 12 and the cabin 17 at the left side of the upper frame 10, in order to filter engine intake air. The air intake piping 23 interconnects the air cleaner 22 and an air suction port of the engine 13.

In the above-described excavator according to the comparison example, all of the equipment to be installed outside the engine room 12, including the hydraulic tank 18 and the fuel tank 19, is arranged in the same plane of the upper surface of the upper frame; therefore, addition of required equipment causes a plane space for the existing equipment to be reduced, thus occurring various negative effects. For example, an excavator, while having only an originally heavily limited space is heavily limited, is required to accept installation of additional equipment such as a liquid reducing-agent tank, which accumulates a reducing agent for reducing and purifying exhaust gas, and a large battery associated with hybridization of machines; this addition involves the following negative effects.

For example, in the equipment space in the front portion at the right side of the upper frame 10 shown in FIGS. 9 and 10, if the arrangement direction of the tanks 18 and 19 was changed from the front and rear direction as shown in the drawings into the right and left direction as described in Japanese Patent No. 5106711, in order to create a space for the additional equipment, a size in the right and left direction, or a width size, of the center foothold 20 should be reduced, which would deteriorate maintenance workability.

Besides, rearward of the cabin at the left side of the upper frame, if the fuel tank is placed as described in Japanese Patent Application Laid-open No. H08-302734 and Japanese Patent Application Laid-open No. 2000-104280 in the space where the air cleaner 22 was originally placed as described in Patent Japanese Utility Model Application Laid-open No S63-48965 and the position of the air cleaner was shifted to a position forward of the engine room at the right side of the fuel tank (Japanese Patent Application Laid-open No. 2000-104280), it would become difficult to perform maintenance of the air cleaner, even with the center foothold provided on the air cleaner, or the provision of the center foothold itself would become impossible, or the front and rear size of the foothold should be reduced.

Respective excavators according to the first and second embodiments of the invention are designed to obviate the above inconvenience, while having a common configuration with the excavators shown in FIGS. 9 and 10 in the following points.

Figure 1:
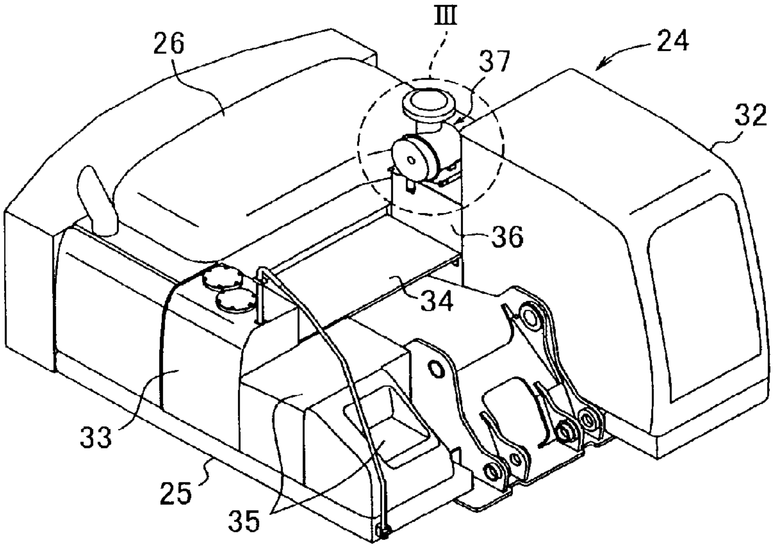
FIG. 1 is a perspective view of an upper slewing body of an excavator according to a first embodiment of the present invention.
Figure 2:
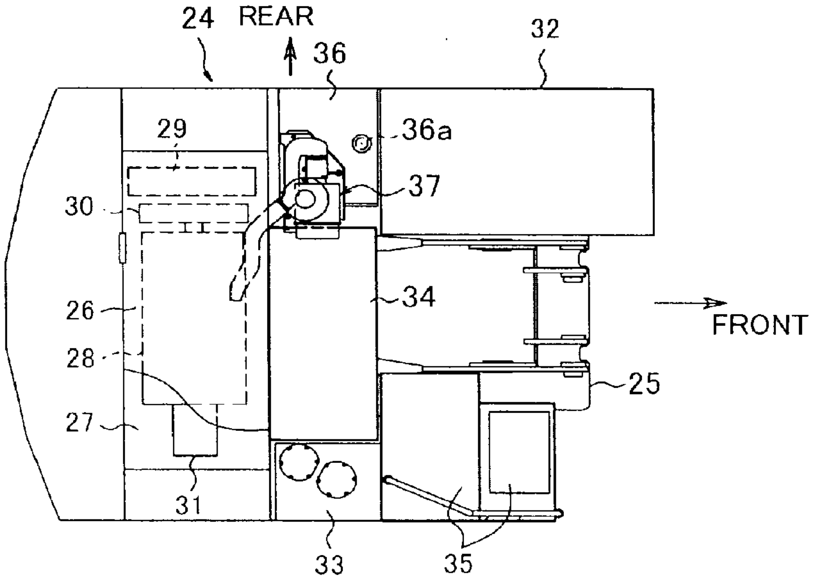
FIG. 2 is a plan view of the excavator.
Figure 3:
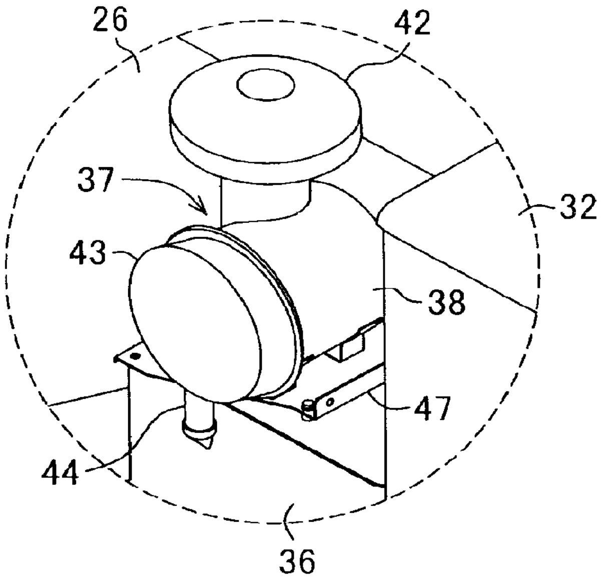
FIG. 3 is an enlarged view of a portion surrounded by a circle III in FIG. 1.
Figure 4:
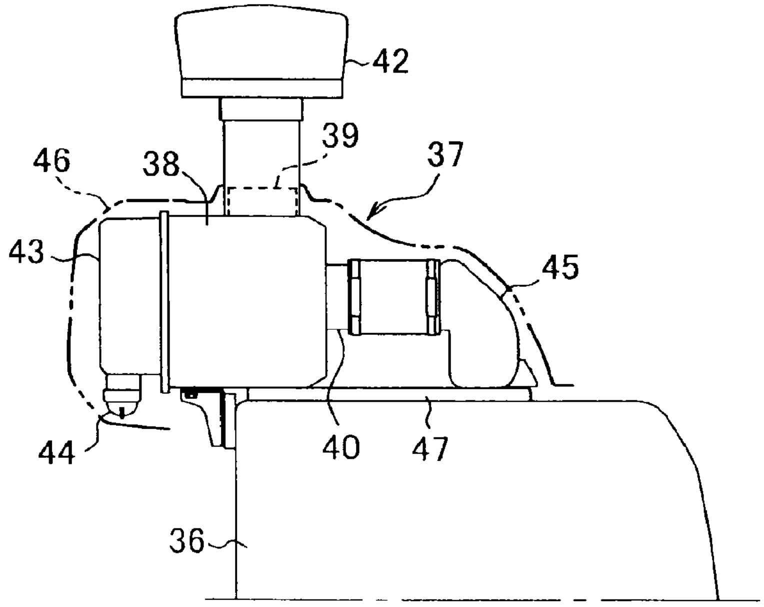
FIG. 4 is a front view of a portion shown in FIG. 3.
Figure 5:
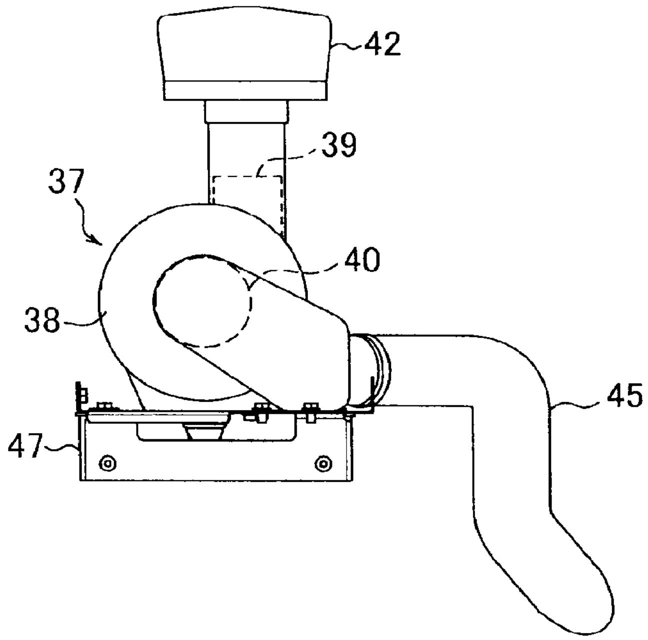
FIG. 5 is a side view of an air cleaner and a mounting bracket in the excavator.

Specifically, the excavators according to the first and second embodiments include a not-graphically-shown lower travelling body and an upper slewing body 24 mounted on the lower travelling body slewably about an axis perpendicular to the ground, the upper slewing body 24 including an upper frame 25 as a base on which various devices and equipment are provided. The various devices and equipment include an engine room 27, an engine 28 as a power source, related devices of the engine 28, a cabin 32, a plurality of tanks including a hydraulic tank 33 and a fuel tank 36, a center foothold 34, and a climbing step 35. The engine room 27 is provided rearward of the upper frame 25, and is opened and closed by a bonnet 26. The engine 28 and the related devices are accommodated in the engine room 27, the related devices including a radiator 29, a cooling fan 30, and a hydraulic pump 31. The cabin 32 is installed at a position forward of and the left side of the engine room 27. The hydraulic tank 33, which is a tank accumulating a hydraulic fluid and corresponds to a "first tank", is provided at a position on the opposite side to the cabin 32 with respect to the right and left direction in the upper frame 25, i.e., at the right side, and forward of the engine room 27. The center foothold 34 is used for the maintenance of devices including the engine 28 in the engine room 27, being provided on a portion immediately forward of the engine room 27 and widthwise intermediate of the upper frame 25. The climbing step 35 is formed into a stair shape to guide the maintenance person to the center foothold 34, being disposed forward of the hydraulic tank 33. FIG. 2 indicates a thick line surrounding the center foothold 34 and the climbing step 35. The fuel tank 36 is a tank which accumulates the fuel and corresponds to a "second tank".

In the first and second embodiments, the fuel tank 36 corresponding to the second tank is placed at a position rearward of the cabin 32 in the upper frame 25, that is, at a position between the cabin 32 and the engine room 27; on the fuel tank 36, there is placed an air cleaner 37 that filters engine intake air. In other words, the hydraulic tank 33 and the fuel tank 36 which are arranged at the right side of the upper frame 25 according to the conventional technique shown in FIGS. 9 and 10 are arranged on the right and left sides on the upper frame 25, respectively, in the first and second embodiments, with a three-dimensional arrangement of the air cleaner 37 superposed on top of the fuel tank 36. The present arrangement enables an empty space to be produced forward of the hydraulic tank 33, that is, under the climbing step 35, allowing other additional equipment such as either one of or both of a liquid reducing-agent tank and a battery for hybrid machines to be disposed in the produced space.

Figure 6:
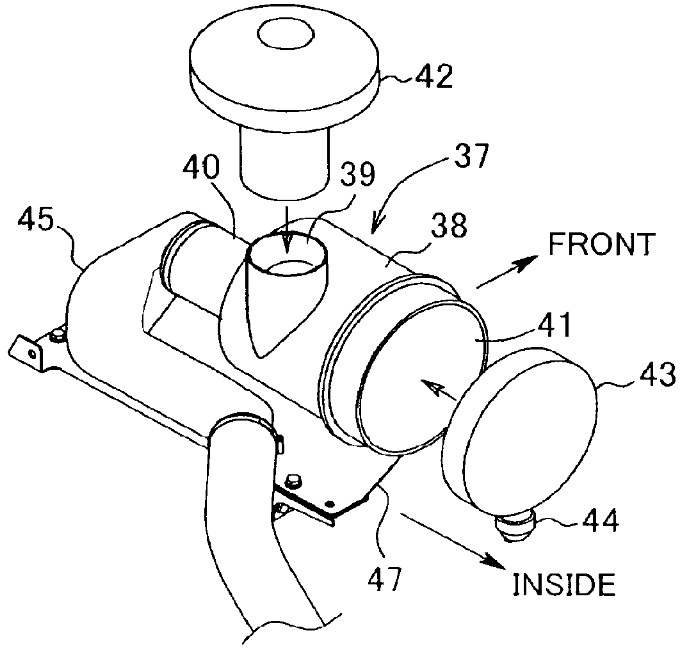
FIG. 6 is a perspective view of the air cleaner and the mounting bracket in the excavator.

As shown in detail in FIGS. 3 to 6, the air cleaner 37 includes: a main body 38 internally accommodating a not-graphically-shown filter and having a cylindrical outer peripheral surface; an air intake portion 39 protruding upward beyond the cylindrical outer peripheral surface of the main body 38 and having an air intake port; an exhaust portion 40 provided at one end side in the axis direction of the main body 38 and having an exhaust port; a filter take-in and take-out port 41 shown in FIG. 6 which port is opened at an end part on the opposite side to the exhaust portion 40; an air intake cylinder 42 fitted to the air intake portion 39; an end cover 43 detachably attached to the filter take-in and take-out port 41; and an evacuator 44 shown in FIGS. 3 to 6. The evacuator 44, which is what is called a dust eliminator, protrudes downward beyond the lower surface of the end cover 43. The exhaust portion 40 is connected to an air suction port of the engine 28 via an air intake piping 45. The air cleaner 37 is covered with an outer cover 46.

The air cleaner 37 is integrally attached to a bracket 47 in advance so as to configure what is called a sub-assembly in cooperation with the bracket 47. The bracket 47 is fastened to the upper surface of the fuel tank 36, for example, with bolts.

The first embodiment shown in FIGS. 1 to 6 and the second embodiment shown in FIGS. 7 and 8 are different from each other, in the placement state of the air cleaner 37. Details are as follows.

The fuel tank 36 according to the first embodiment has an upper surface which is entirely flat. As shown in FIG. 2, the fuel tank 36 has a fuel filling portion 36*a* located in a front portion of the upper surface of the fuel tank 36, and the oil filling portion 36*a* has an oil filling port. The air cleaner 37 is placed at a position deviated from the oil filling portion 36*a* rearward, that is, to an engine room 27 side, so as not to be superposed on the oil filling portion 36*a*, that is, so as not to interfere with oil filling. In short, the air cleaner 37 is so placed as to be superposed on a rear portion of the upper surface of the fuel tank 36. Furthermore, the placement satisfies the following conditions (I) and (11):

(I) the filter take-in and take-out port 41 and the end cover 43 attached to the filter take-in and take-out port 41 face widthwise inward of the upper frame 25, i.e., to the center foothold 34 side, that is, the exhaust port faces outward; and (II) the evacuator 44 is located at the inside of the inner end of the fuel tank 36 so as to prevent dusts discharged from the evacuator 44 from falling and depositing on the upper surface of the fuel tank 36.

Besides, the air intake piping 45 according to the first embodiment has a shape of returning inward in a U-shape from a portion connected to the exhaust port which faces outward so as to be connected to the engine 28 in FIG. 2.

On the other hand, the fuel tank 36 in the second embodiment has an L-shaped side surface. Specifically, the fuel tank 36 has an upper surface including a rear portion and a front portion, the rear portion being lower than the front portion by a step given between the rear portion and the front portion. The oil filling portion 36*a* is provided in the front portion of the upper surface as the high level portion, while the air cleaner 37 is placed on the rear portion of the upper surface as the low level portion. Furthermore, the placement of the air cleaner 37 satisfies the following conditions (i) and (ii):

(i) the filter take-in and take-out port 41 and the end cover 43 attached to the filter take-in and take-out port 41 face the outside in the width direction of the upper frame 25, that is, the exhaust port faces inward; and (ii) The evacuator 44 is located outside the outer end of the fuel tank 36 so as to prevent dusts discharged from the evacuator 44 from falling and depositing on the upper surface of the fuel tank 36.

The reference numerals used in the description of the above conditions (i) and (ii) and not shown in FIGS. 7 and 8 indicate respective reference numerals used in FIGS. 3 to 6.

The air intake piping 45 in the second embodiment is connected to the engine 28 straight, that is, with no return portion, from the exhaust port facing inward as described above,.

According to the first and second embodiments, the following common effects (1) and (2) can be obtained.

(1) Placing the hydraulic tank 33 and the fuel tank 36 as large equipment on the right and left sides on the upper frame 25, respectively, and superposing the air cleaner 37 on the fuel tank 36 allow width of the center foothold 34 on the widthwise intermediate portion of the upper frame 25 to be secured to thereby enable satisfactory maintenance of the devices in the engine room 27 to be performed, while producing an installation space of the other equipment (a liquid reducing-agent tank and a battery for hybrid machines).

(2) The vertically three-dimensional arrangement of the fuel tank 36 and the air cleaner 37 also allows maintenance of the air cleaner 37 to be performed.

Furthermore, the first embodiment permits the following intrinsic effects (3) to (5) to be obtained.

(3) Placing the air cleaner 37 on the rear portion of the upper surface of the fuel tank 36, i.e., at the engine room 27 side, allows a length of the air intake piping 45 interconnecting the air cleaner 37 and the engine 28 to be small, as compared with the case of placing the air cleaner 37 on the front portion of the upper surface, and prevents the oil filling portion 36*a* from interfering with the piping. These facts facilitate the piping work of the air intake piping 45 and enable the air intake piping 45 to have reduced inhalation resistance.

(4) The air intake piping 45, separated from the oil filling portion 36*a*, cannot interfere with the oil filling work to the fuel tank 36 and thus facilitate it.

(5) Placing the air cleaner 37 on the fuel tank 36 in the state where the filter take-in and take-out port 41 thereof faces inward in the width direction of the upper frame 25 allows take-in and take-out of the filter as a main item of maintenance work on the air cleaner 37 to be easily and safely performed at the inside, that is, at the center foothold 34.

Besides, the second embodiment permits the following intrinsic effects (6) to (8) to be obtained.

(6) The air cleaner 37, placed on the fuel tank 36 in the state where the exhaust port thereof faces inward in the width direction of the upper frame, allows the air intake piping 45 to be connected straight to the engine 28 without a detour portion. This allows facilitating piping, reducing cost, and minimizing the inhalation resistance to be achieved.

(7) Since the upper surface of the fuel tank 36 includes the high level surface and the low level surface and the air cleaner 37 is placed on the low level surface of the upper surface, a total height of the fuel tank 36 and the air cleaner 37 can be suppressed, which allows a range of a rear view from the inside of the cabin 32 to be secured.

(8) Since the low level surface of the fuel tank 36 is located rearward of the high level surface and the filter take-in and take-out port 41 of the air cleaner 37 is disposed in the low level surface on the rear side in the state where the filter take-in and take-out port 41 faces outward in the width direction of the upper frame 25, the filter take-in and take-out port 41 faces outward at a low position; this allows the operator to take in and take out the filter on the ground, particularly in the construction machine whose total height is originally relatively small, without taking trouble to ride on the center foothold 34. Furthermore, since the exhaust port is allowed to be at a low position and near to the height level of the air suction port of the engine 28, there is no need for substantially lowering the air intake piping connected to the air cleaner, to a level of the air suction port, by bending the air intake piping in the middle thereof, unlike the case of placing the air cleaner on the upper surface of the tank having no step. This allows facilitating piping, reducing a length of the piping and reducing the inhalation resistance to be achieved.

The present invention includes the following embodiment, for example, in addition to the first and second embodiments.

As a third embodiment which is a variation of the second embodiment, the low level surface of the upper surface of the fuel tank 36 may be located forward of the high level surface, the oil filling portion 36a being provided in the high level surface and the air cleaner 37 being provided in the low level surface. Besides, in the second and third embodiments, the air cleaner 37 is also permitted to be placed in the state where the filter take-in and take-out port 41 of the air cleaner 37 faces inward in the width direction of the upper frame 25 so as to allow take-in and take-out of the filter to be performed at the center foothold 34.

While the fuel tank 36 in the above embodiments is installed at the left side of the upper frame 25 as the second tank and the air cleaner 37 is placed on the fuel tank 36, it is also permitted to place the hydraulic tank 33 at the left side as the second tank and place the air cleaner 37 on the hydraulic tank 33.

The present invention is not limited to the excavator but permitted to be similarly applied to various construction machines configured by utilization of the excavator.

As described above, the present invention provides a construction machine capable of accepting additional equipment, without troubles, by effective utilization of an existing space in an upper frame. The provided construction machine includes: a lower travelling body; an upper slewing body slewably mounted on the lower travelling body and including an upper frame serving as a base; an engine room provided on a rear portion of the upper frame and accommodating an engine as a power source and related devices of the engine; a cabin provided on a front portion of one of right and left sides of the upper frame; a plurality of tanks placed on the upper frame and including a fuel tank which accumulates a fuel and a hydraulic tank which accumulates hydraulic fluid; an air cleaner which filters intake air of the engine; a center foothold for maintenance work provided on a portion of the upper frame forward of the engine room and on a widthwise intermediate portion of the upper frame; and a climbing step provided on a portion of the upper frame on an opposite side to the cabin and formed into a stair shape for guiding a maintenance person to the center foothold. The plurality of tanks includes a first tank which is disposed on a portion on one side of right and left sides in the upper frame and a second tank disposed on a portion on the other side of the right and left sides in the upper frame and between the cabin and the engine room, the air cleaner being superposed on the second tank.

According to the configuration, placing the first and second tanks on respective right and left sides and three-dimensionally superposing the air cleaner on top of the second tank make it possible to secure a space on the widthwise intermediate portion of the upper frame, that is, to secure a width size of the center foothold, to thereby hold satisfactory maintenance workability to the devices in the engine room, while obtaining the installation space for other equipment such as a liquid reducing-agent tank and a battery for hybrid machines. The superposition of the air cleaner on the second tank allows maintenance of the air cleaner to be performed.

Specifically, it is preferable that the fuel tank has an upper surface and an oil filling portion located in a front portion of the upper surface, that the fuel tank is placed as the second tank between the cabin and the engine room, and that the air cleaner is placed on a rear portion of the upper surface of the fuel tank in the state where the air cleaner is not superposed on the oil filling portion. Thus placing the air cleaner on the rear portion of the upper surface of the fuel tank, that is, on a portion at the engine room side, allows the air intake piping interconnecting the air cleaner and the engine to be shorten and prevents the oil filling portion from interfering with routing. These facilitate arrangement of the air intake piping. Besides, the air intake piping, located far from the oil filling portion, allows filling the fuel tank with oil to be easily performed.

The air cleaner preferably has a filter take-in and take-out port and is superposed on the second tank so as to make the filter take-in and take-out port face inward in the width direction of the upper frame. This allows the take-in and take-out of the filter as a main item of maintenance work on the air cleaner to he easily and safely performed at the inside, that is, at the center foothold.

Alternatively, the air cleaner may have an exhaust port and is superposed on the second tank so as to make the exhaust port face inward in the width direction of the upper frame. This allows the exhaust port of the air cleaner, that is, a connection port of the air intake piping to the air cleaner, to face the air intake port side, thereby enabling the air intake piping to be connected straight to the engine with no detour portion. This allows facilitate piping, reduce cost, and minimize the inhalation resistance to be achieved.

It is preferable that the second tank has an upper surface including a high level surface and a low level surface which is lower than the high level surface and arranged with the high level surface in the front and rear direction, the air cleaner being placed on the low level surface. This allows a total height size of the second tank and the air cleaner to be reduced, thereby enabling a range of a rear view from the inside of the cabin to be secured.

Alternatively, it is preferable that the second tank has an upper surface including a high level surface and a low level surface which is lower than the high level surface and located rearward of the high level surface, and that the air cleaner has a filter take-in and take-out port and an exhaust port, and is placed on the low level surface in the state where the filter take-in and take-out port faces outward and the exhaust port faces inward in the width direction of the upper frame. This placement allows the filter take-in and take-out port to face outward at a low position, thereby enabling the operator to take in and take out the filter on the ground, particularly in the construction machine having originally a relatively low total height, without taking the trouble of riding on the center foothold. Besides, the exhaust port is allowed to be at a low position and near to the height level of the air suction port of the engine, thus eliminating necessity for substantially lowering the air intake piping to a level of the air suction port of the engine by bending the air intake piping in the middle thereof, unlike the case of placing the air cleaner on the upper surface of the tank having no step. This allows facilitating piping, reducing a length of the piping and reducing the inhalation resistance to be achieved.

This application is based on Japanese Patent application No. 2013-239422 filed in Japan Patent Office on Nov. 20, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:

a lower travelling body;

an upper slewing body slewably mounted on the lower travelling body and including an upper frame serving as a base;

an engine room provided on a rear portion of the upper frame and accommodating an engine as a power source and related devices of the engine;

a cabin provided on a front portion of one of right and left sides of the upper frame;

a plurality of tanks placed on the upper frame and including a fuel tank which accumulates a fuel and a hydraulic tank which accumulates hydraulic fluid;

an air cleaner which filters intake air of the engine;

a center foothold for maintenance work provided on a portion of the upper frame forward of the engine room and on a widthwise intermediate portion of the upper frame; and a climbing step provided on a portion of the upper frame on an opposite side to the cabin and formed into a stair shape for guiding a maintenance person to the center foothold, wherein the plurality of tanks include a first tank which is placed on a portion on one side of right and left sides in the upper frame and a second tank which is placed on a portion on the other side of the right and left sides in the upper frame and between the cabin and the engine room, the second tank having an upper surface lower than an upper surface of the cabin, the air cleaner being placed on the upper surface of the second tank and rearward of the cabin.

2. The construction machine according to claim 1, wherein the air cleaner has a filter take-in and take-out port and is superposed on the second tank so as to make the filter take-in and take-out port face inward in a width direction of the upper frame.

3. The construction machine according to claim 1, wherein the air cleaner has an exhaust port and is superposed on the second tank so as to make the exhaust port face inward in a width direction of the upper frame.

4. The construction machine according to claim 1, wherein both of the first and second tanks are arranged entirely between the cabin and the engine room in a front-rear direction of the upper frame, and wherein the center foothold for maintenance work is provided between the first and second tanks in a widthwise direction of the upper frame and entirely between the cabin and the engine room in the front-rear direction of the upper frame.

5. A construction machine comprising:

a lower travelling body;

an upper slewing body slewably mounted on the lower travelling body and including an upper frame serving as a base;

an engine room provided on a rear portion of the upper frame and accommodating an engine as a power source and related devices of the engine;

a cabin provided on a front portion of one of right and left sides of the upper frame;

a plurality of tanks placed on the upper frame and including a fuel tank which accumulates a fuel and a hydraulic tank which accumulates hydraulic fluid;

an air cleaner which filters intake air of the engine;

a center foothold for maintenance work provided on a portion of the upper frame forward of the engine room and on a widthwise intermediate portion of the upper frame; and a climbing step provided on a portion of the upper frame on an opposite side to the cabin and formed into a stair shape for guiding a maintenance person to the center foothold, wherein the plurality of tanks include a first tank which is placed on a portion on one side of right and left sides in the upper frame and a second tank which is placed on a portion on the other side of the right and left sides in the upper frame and between the cabin and the engine room, the air cleaner being superposed on the second tank, wherein: the fuel tank has an upper surface and an oil filling portion which is arranged in a front portion of the upper surface; the fuel tank is placed as the second tank between the cabin and the engine room; and the air cleaner is placed on a rear portion of the upper surface of the fuel tank so as not to be superposed on the oil filling portion.

6. A construction machine comprising:

a lower travelling body;

an upper slewing body slewably mounted on the lower travelling body and including an upper frame serving as a base;

an engine room provided on a rear portion of the upper frame and accommodating an engine as a power source and related devices of the engine;

a cabin provided on a front portion of one of right and left sides of the upper frame;

a plurality of tanks placed on the upper frame and including a fuel tank which accumulates a fuel and a hydraulic tank which accumulates hydraulic fluid;

an air cleaner which filters intake air of the engine;

a center foothold for maintenance work provided on a portion of the upper frame forward of the engine room and on a widthwise intermediate portion of the upper frame; and a climbing step provided on a portion of the upper frame on an opposite side to the cabin and formed into a stair shape for guiding a maintenance person to the center foothold, wherein the plurality of tanks include a first tank which is placed on a portion on one side of right and left sides in the upper frame and a second tank which is placed on a portion on the other side of the right and left sides in the upper frame and between the cabin and the engine room, the air cleaner being superposed on the second tank, wherein the second tank has an upper surface including a high level surface and a low level surface which is lower than the high level surface and arranged with the high level surface in a front and rear direction, the air cleaner being placed on the low level surface.

7. A construction machine comprising:

a lower travelling body;

an upper slewing body slewably mounted on the lower travelling body and including an upper frame serving as a base;

an engine room provided on a rear portion of the upper frame and accommodating an engine as a power source and related devices of the engine;

a cabin provided on a front portion of one of right and left sides of the upper frame;

a plurality of tanks placed on the upper frame and including a fuel tank which accumulates a fuel and a hydraulic tank which accumulates hydraulic fluid;

an air cleaner which filters intake air of the engine;

a center foothold for maintenance work provided on a portion of the upper frame forward of the engine room and on a widthwise intermediate portion of the upper frame; and a climbing step provided on a portion of the upper frame on an opposite side to the cabin and formed into a stair shape for guiding a maintenance person to the center foothold, wherein the plurality of tanks include a first tank which is placed on a portion on one side of right and left sides in the upper frame and a second tank which is placed on a portion on the other side of the right and left sides in the upper frame and between the cabin and the engine room, the air cleaner being superposed on the second tank, wherein: the second tank has an upper surface including a high level surface and a low level surface which is lower than the high level surface and located rearward of the high level surface; the air cleaner has a filter take-in and take-out port and an exhaust port; and the air cleaner is placed on the low level surface so that the filter take-in and take-out port faces outward and the exhaust port faces inward in a width direction of the upper frame.

* * * * *